(12) United States Patent
Coble et al.

(10) Patent No.: US 11,934,413 B2
(45) Date of Patent: Mar. 19, 2024

(54) TECHNIQUES AND SYSTEMS FOR SMART NATURAL LANGUAGE PROCESSING OF SEARCH RESULTS

(71) Applicant: Capital One Services, LLC, McLean, VA (US)

(72) Inventors: Piper Alexandra Coble, Richmond, VA (US); Natalie Kuhn, New York, NY (US); Paul Cho, Boston, MA (US); Ryan M. Parker, Dallas, TX (US); Sergey Petrunin, Cambridge, MA (US); Gary B. Williams, Williamsburg, VA (US); Eric Campbell, Midlothian, VA (US); Lin Ni Lisa Cheng, Fresh Meadows, NY (US); Matthew Kevin Sullivan, Midlothian, VA (US); Chris Demchalk, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 203 days.

(21) Appl. No.: 17/530,149

(22) Filed: Nov. 18, 2021

(65) Prior Publication Data

US 2023/0153309 A1   May 18, 2023

(51) Int. Cl.
*G06F 16/2457* (2019.01)
*G06F 16/242* (2019.01)
*G06F 16/28* (2019.01)

(52) U.S. Cl.
CPC ...... *G06F 16/24578* (2019.01); *G06F 16/243* (2019.01); *G06F 16/285* (2019.01)

(58) Field of Classification Search
CPC . G06F 16/24578; G06F 16/243; G06F 16/285
See application file for complete search history.

(56) References Cited

U.S. PATENT DOCUMENTS

| | | | | |
|---|---|---|---|---|
| 2013/0041896 | A1* | 2/2013 | Ghani | G06F 16/3328 707/E17.014 |
| 2014/0380105 | A1* | 12/2014 | Michel | G06F 11/0709 714/57 |
| 2016/0188769 | A1* | 6/2016 | Aylott | G06Q 50/06 703/6 |
| 2017/0344899 | A1* | 11/2017 | Zimmerman | G06N 20/00 |
| 2019/0057094 | A1* | 2/2019 | Barijough | G06F 16/24578 |
| 2021/0149963 | A1* | 5/2021 | Agarwal | G06F 16/90332 |

* cited by examiner

*Primary Examiner* — Jay A Morrison
(74) *Attorney, Agent, or Firm* — KDW Firm PLLC (57) ABSTRACT

A system, processes, and a computer-readable storage medium are provided method includes receiving a search query including one or more of a textual phrase, a document, or data including metadata from a user. For example, a processor may execute a theme-generating machine learning algorithm to generate a theme of the search query. Profiles of other users are identified as similar to a profile of the user may be located. A search history of each of the located other users may be located in the collected search history. Content in the searchable content that corresponds to the generated theme of the search query and according to a result of the evaluation of the located search history of each of the other users may be obtained. The obtained content may be scored based on a scoring algorithm and output a set of scored search results to the input/output device.

17 Claims, 5 Drawing Sheets

TECHNIQUES AND SYSTEMS FOR SMART NATURAL LANGUAGE PROCESSING OF SEARCH RESULTS

BACKGROUND

Some enterprises maintain or have access to large amounts of data that is analyzed and evaluated for numerous reasons. In addition, enterprise persons commonly search the data for information related to an infinite number of reasons, such as business research, regulatory compliance, technical research, financial analysis and planning, historical events and numerous other reasons. The data search may be typically performed by a client device-based search engine, which is a computer program that searches for and identifies items in a database that most commonly corresponds to keywords or characters, or images specified by the user in a search query. In order to assist users in narrowing the number of results to their inputted search, search engine developers have provided pre-set filters that users may select focus the search parameters.

The pre-set filters may have some tunable aspects, such as date or time range, a file size or file type. In essence, each of the pre-set filters incorporates a semi-fixed bias into the search. A semi-fixed bias that is determined by a search developer that is supposedly to accommodate a wide range of users. As a result, a common problem with database search engines is the filtering of the accumulated data in an enterprise database to quickly provide results that are most relevant to the user's search query. Often a user sets data filters that counterintuitively cause search results to be identified that may not be the most relevant to the inputted user query.

The problem addressed in the following detailed description is the effect of biases in a natural language processing model that cause search query results to be biased toward certain content types of a particular format or length instead of language. The effect of the biases may be inadvertently amplified by the use of preset filters that have minimal or no context with the search query. It would be beneficial if a natural language processing model utilized contextual information based on the language of a present search query as well as past search results related to the same context instead of using filtering that has no context.

SUMMARY

In one aspect, a system having a processor and a memory is described. The memory may be operable to store programming code including a search result scoring application as well as a number of user profiles and a collected search history. The collected search history may be a database that includes search terms used in a query of other users, results from the query of the other users, and a degree of engagement with results from the other users search results. The system also includes an input/output device. The processor of the system may be operable to receive, via the input/output device, a search query including one or more of a textual phrase, a document, or data including metadata from a user. The processor may be operable to generate a theme of the search query based on an evaluation of the search query. Other users that have profiles similar to a profile of the user that inputted the search query may be located. A user profile is based on a user group to which the other user and other users are assigned. The processor may obtain a plurality of search histories by retrieving a search history of each of the located other users from the collected search history. Content corresponding to the generated theme may be identified by the processor in at least one of the plurality of search histories. The processor may execute the search query to obtain content corresponding to the generated theme of the search query from a searchable content module. The searchable content module includes public source content and internal source content. The obtained content and the identified content may be scored using a scoring algorithm based on a result of an evaluation of search history results considered relevant to each of the other users with respect to the generated theme of the search query. The processor may output a set of scored search results to the input/output device.

In one aspect, a method executable by the processor is provided. The method includes receiving, via an input/output device coupled to the processor, a search query including one or more of a textual phrase, a document, or data including metadata. The processor may generate by executing a theme-generating machine learning algorithm, a theme of the search query. Profiles of other users from a plurality of user profiles that are identified as similar to the user profile based on a group to which the other users are assigned may be located. A search history of each of the located other users having the profile identified as similar to the user profile in the collected search history may be located. The located search history of each of the other users having the profile identified as similar to the user profile and the user in the located search history based on the generated theme of the search query may be evaluated by the processor. Content in the searchable content that corresponds to the generated theme of the search query and according to a result of the evaluation of the located search history of each of the other users may be obtained. The searchable content includes public source content and internal source content. The processor may score the obtained content based on a scoring algorithm and output a set of scored search results to the input/output device.

In one aspect, a non-transitory computer-readable storage medium is provided that includes instructions that when executed by a processor, cause the processor to receive, via an input/output device, a search query including one or more of a textual phrase, a document, or data including metadata. A theme-generating machine learning algorithm may generate a theme of the search query. The instructions cause the processor to locate profiles of other users from a plurality of user profiles that are identified as similar to a user profile of a user from whom the search query was received based on a group that the other users are assigned. A search history of each of the other users having a profile identified as similar to the user profile in a collected search history may be caused to be located. The processor may be caused to evaluate the located search history of each of the other users having the profile identified as similar to a user profile and the user in the located search history based on the generated theme of the search query. Content corresponding to the generated theme of the search query may be caused to be obtained by a processor from a searchable content module. The searchable content may include public source content and internal source content. The obtained content may be scored based on a result of the evaluating of the located search history of each of the other users having the profile identified as similar to the user profile, and a set of scored search results may be caused to be output to the input/output device.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

The following describes techniques and system that provides improved search results for a database search query by developing a context for the search query. The disclosed techniques narrowing down the search results for users without using static filter settings. Rather than having the user page through and/or attempt to set appropriate filters, the disclosed techniques and system provides improved search results by modeling an ideal list or results given what the system knows about the user's role within a group of users and the current context of a user's search subject matter. For example, a current context may be issues have been opened recently by a user group (that may include the user) within an enterprise, subject matter that is usually open this time of year (e.g., tax issues at end of calendar year, budgetary issues at the end of a fiscal year, or the like), what subjects or topics the user's peers (within the user group including the user) are researching, how industry trends are shaping current risk models for the respective subjects.

The problem addressed in this disclosure are the biases that result in a natural language processing model that cause results to be biased toward content types of a particular format or length instead of language. It would be beneficial if the language of a present search query as well as past search results related to the same context (i.e., subject matter) as the present search query were considered during the processing of the search query instead of using static filtering (e.g., plurals off, date range limits, or the like) that has no context.

Before a detailed discussion of the figures is provided, it may be helpful to have a general discussion of the disclosed techniques. In a high level operational example, a user may wish to search for information related to a particular subject, such as a regulatory question presented by a regulator, such as the Federal Deposit Insurance Corporation (FDIC), or the like. The search query may be formulated in an attempt to see whether there was a past engagement with the particular regulator and the presented regulatory question. The search query and search result scoring application may be operable to identify reasons behind why the regulatory question was asked, whether the question been asked before, and, if so, how was it responded to previously, and if not, what information is needed to formulate the response. The search result scoring application is a tool that utilizes the theme (described in more detail below) of the search query to better identify information (i.e., content) that elucidates the reasons and surrounding circumstances of the regulatory question and enables formulation of a concise and thorough response. A user's search query may be input as a user input to a search result scoring application. The processor may be operable to generate a theme from the user's search query and perform a search of content in a searchable content module based on a theme. The search results may provide an audit on report on this on date, same or similar question on a particular date, the subject matter also appears in a regulatory handbook at section GOV, a similar entity received a consent order on a specific date according to a news source. The search engine and the search results are both improved because they provide a context around the subject matter of the search query as opposed to a list of keywords in different types of content. Therefore, a user group attempting to answer the question is provided with the contextual results. The following examples describe aspects of the provide improved systems and capabilities for searching for relevant content.

Figure 1:
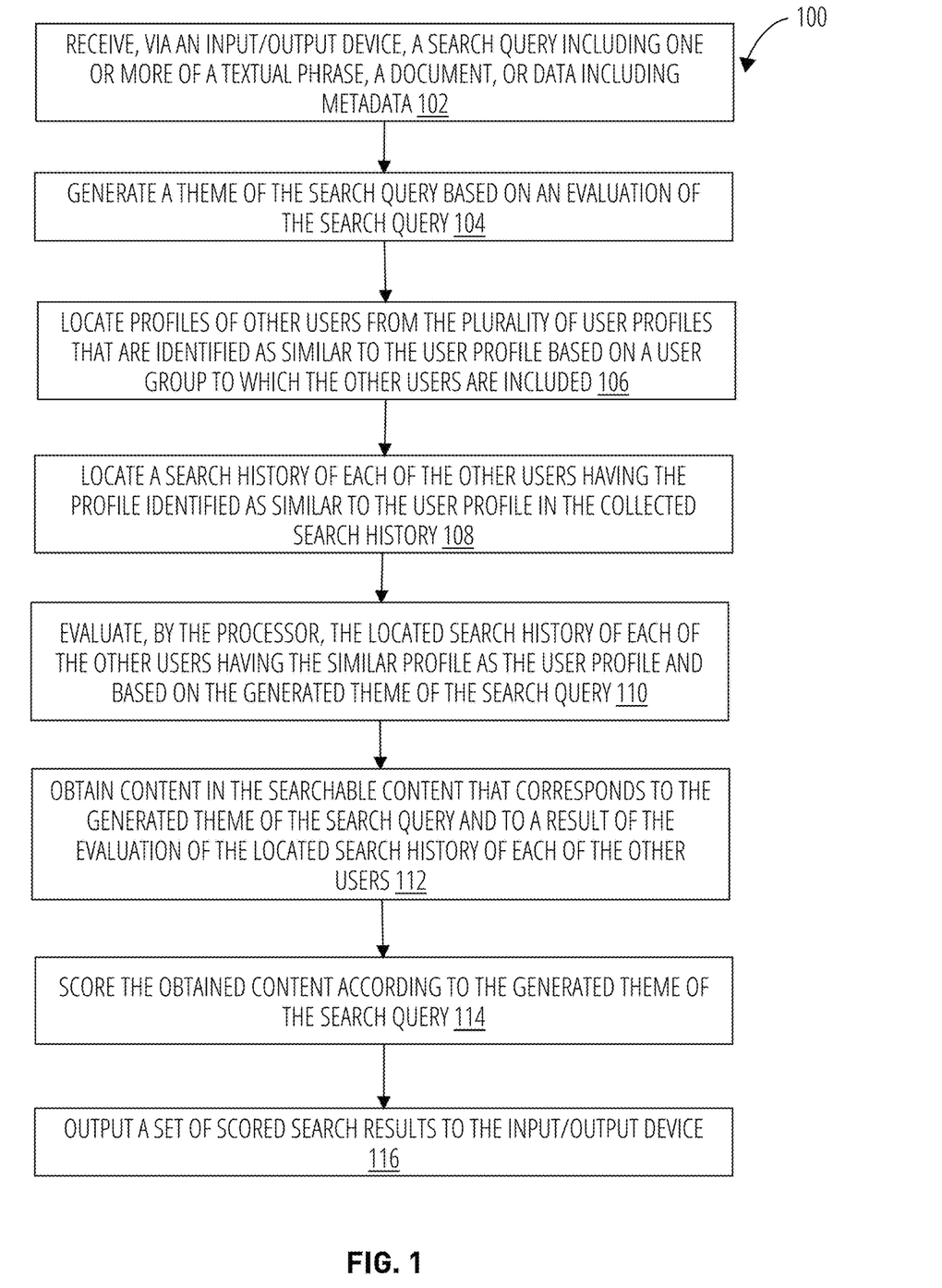
FIG. 1 illustrates a flowchart of a process in accordance with an embodiment of the disclosed subject matter.

FIG. 1 illustrates a flowchart of a process in accordance with an embodiment of the disclosed subject matter. The process 100 may be implemented on a processor such as that described with reference to the examples of FIGS. 2 and 3. The process 100 is an example process for implementing an improved contextual search that addresses the above-described issues of typical database search engines and tools.

For example, a processor executing the search result scoring application may, as shown in block 102, receive, via an input/output device, a search query including one or more of a textual phrase, a document, or data including metadata. Metadata may include structural metadata that indicates organizational relationships between documents, administrative metadata that indicates the technical source of the document, and descriptive metadata that is data that describes the document and is usable to find the document. While the term "document" is used in the description, it should be understood that a document may be an electronic file or a digital file that may be stored in a memory, such as an electronic data storage or a cloud storage. Examples of metadata may include information related to a document creator, a last user to modify the document, a document source, a date/time stamp of document creation, keywords associated with the document, publication date, publisher, whether the document is a single document or part of a collection of multiple documents, page numbers, sections, chapters, data related to the document, raw data (e.g., dollar values, foreclosures, account closings, account openings), or the like.

In block 104, the processor may execute a theme-generating machine learning algorithm that enables the processor to generate a theme of the search query. The theme-generating machine learning algorithm when generating the theme of the search query may cause the processor to evaluate the search query using a natural language processing algorithm. For example, the results or output of the natural language processing algorithm may be input into the theme-generating machine learning algorithm. In addition to the results or output of the natural language processing algorithm, metadata that may include data related to the textual phrase, the document or the data may be input into the theme-generating machine learning algorithm. The theme-generating machine learning algorithm may be operable to evaluate the metadata related to the textual phrase, the document (e.g., electronic file) or the raw data alone or in combination with the output from the natural language processing algorithm. The theme of the search query may be, for example, a general or specific subject to the search query. Examples of a search query theme may be a regulatory request, a financial audit request, a credit review, foreclosure analysis of real estate or personal property (e.g., automobile or boat), a particular subject, such a privacy, privacy law, compliance, statutory interpretation, or the like. The theme may provide the "context" of the search query. Alternatively, a user theme may be based on who the user is that is inputting the user's search query. For example, a user may be associated with multiple themes, such as a ten or more, it may be akin to persona of the user that is tied to the user's work assignment category. The work assignment category may be particular product support teams, workplace solutions or other hierarchy of processes that support different business areas of an enterprise. In addition, the user's work assignment category may include an indication of the user's role within the user group and each role may be assigned a scoring metric (e.g., a multiplier or coefficient that is applied by the search result scoring application to content items identified as relevant). For example, a user's role within the user group (based on user work assignment category) may be auditor, supervisor, manager, developer or the like and each may be given a specific scoring metric value for scoring content items in the search results (or those content items selected for review or as interesting by the developer). In an example, an auditor may be assigned a scoring metric value (e.g., higher) that is different from that assigned to a developer (e.g., lower) when the theme of the search query is a regulatory function. Conversely, the developer may, for example, have a scoring metric value (e.g., higher) that is different from that assigned to the auditor when the theme of the search query is operation of a mobile device application. In a further alternative example, the auditor and the developer may have a low, or even the same, scoring metric value when the theme of the search query is unrelated to their work assignment category, such as customer relations. In addition, or alternatively, in the context of user's roles, users within the same role, such as analyst, auditor or developer, may have their scoring metric values further differentiated based on experience level, which may or may not be indicated by work assignment category. For example, a first user work assignment category may be senior analyst and a second user work assignment category may be a junior analyst. The scoring algorithm used by the search result scoring application may score content items identified as relevant by the senior analyst higher than the those identified as relevant by the junior analyst (by, for example, using a scoring metric of the senior analyst that is greater than the scoring metric of the junior analyst. The higher scored content item may be presented ahead of the lower scored content item when the search results are presented. A further parameter associated with a work assignment category may be seniority, so instead of having separate work assignment categories assigned to a senior analyst and a junior analyst, the work assignment category may simply be analyst, and a separate scoring metric value directed toward seniority may be given.

The search result scoring application may receive from the theme-generating machine learning algorithm an indication of a theme of the user's search query search query input based on the results of the evaluation of the metadata and the results of the natural language processing algorithm. The generated theme may be used by the search result scoring application to produce search results that are more germane to the theme of the user's search query.

In an example, the search result scoring application may augment a user's search query by complementing it with another user's search query, where the other user has shared interests or shared tasks to the user. For example, the search result scoring application when executed may enable a processor to locate search queries related to the generated theme that had been previously submitted, or even contemporaneously, by the other users who have similar interests or research tasks as the user. The processor may, for example, group the identified other users in a user group whose search history may be evaluated based on the search query of the user. The user and other users may be included in a same user group based on the user and other users having one or more or any of the following in common: a work assignment category (e.g., product team, regulatory response, auditor, accountant, financial solutions, inventory management, or the like), a seniority level, a mentor-mentee relationship, education level, or the like. For example, in block 106, the processor may locate profiles of other users from a number of user profiles that are identified as similar to the user profile based on the other users included in the same group as the user who input the search query. In an example of when locating the profiles of other users from the plurality of user profiles that are identified as similar to the user profile, the processor may identify the other users in a number of user profiles that may have a work assignment category that is the same work assignment category as the user.

The process 100 may proceed to block 108. In block 108, the processor may be operable to locate a search history of each of the other users from the user group. The search history of each of the other users from the user group may include respective search queries and the results of the respective search queries of the users in the user group (i.e., those users having the profile identified as similar to the user profile of the user who input the search query, where the user who input the search query may be referred to as "a particular user") may be collected and stored in a collected search history. For example, when locating a search history of each of the other users (e.g., users in having a profile identified as similar to the user profile, the processor may evaluate past search queries in the located search history of each of the other users having the profile identified as similar to the user profile and the user in the located search history based on the generated theme of the search query.

The processor as it executes process 100 may, at block 110, evaluate the located search history of each of the other users of the user group in the collected search history based on the generated theme of the search query. For example, the processor when evaluating the located search history of each of the other users may identifying past search queries of each user with the identified similar profile or in the same group that have a theme that is the same as the generated theme. In addition, the processor may retrieve the content from the identified past search queries that was indicated as relevant by the respective user of the identified past search queries. For example, the processor may evaluate the search results of in the located search history of a particular user based on the generated theme of the search query and the degree of engagement by that particular user with the specific search results (i.e., the search result content that was of interest to the particular user). A degree of engagement may be a number of times the user opened a specific search result, annotated the specific search result, shared the specific search result with other members (i.e., other users) of the user group, or the like.

In block 112, the processor when executing programming code stored in a memory may be operable to obtain content in the searchable content that corresponds to the generated theme of the search query. For example, the processor may execute a search engine (described in later examples) that may be operable to utilize the generated theme and the results of the evaluations of the located search histories of each of the other users in a search of the searchable content. For example, the processor may have access to a data storage and/or networks (shown in other examples) that enable the processor to search content from different sources, such as public source content and internal source content. Public source content may, for example, be governmental notices (e.g., information from .gov websites), news sights, industry data sources, the internet, public-facing enterprise data, or the like. Internal source content may be, for example, content maintained in a repository by the enterprise for viewing and analysis by users within the enterprise (i.e., not for users external to the enterprise). In addition, or alternatively, the processor may further identify partner source content from a partner source search content repository of the searchable content. Partner source content may be content from other enterprises that have partnered with the enterprise and the content may be generated and may be maintained by all, or a selected number, of the partners and may be searched by the users of the enterprise. Examples of partnerships include an automobile manufacturer and a bank, a university and a book publisher, a sports team and an apparel manufacturer or the like. The partnership may include multiple partners such as a trade association or the like. When the partner source content is identified, the partner source content may be input into the search result scoring application with the identified public source content and identified internal source content.

In an example, the processor may identify content from the search results based on a profile of the user (e.g., work assignment category, experience level, responsibility level or the like), the user's team (e.g., the users with substantially the same user profile or assigned to the same work assignment category) and/or the set degree of engagement with the related content. The set degree of engagement may be a settable, variable value related to how frequently particular content (e.g., a government regulation, partnership agreement, internal data) has been accessed by a particular user and/or the user's team members.

In block 114, the processor executing the process 100 may score the obtained content according to the generated theme of the search query. A scoring algorithm may be used to score the obtained content. In addition, the scoring of the obtained content may be based on an evaluation of previous search queries and the respective results. The respective results may be either those provided by various sources or specific sources (or source) in response to the search query. For example, the previous search queries and the respective results may be evaluated for how relevant elements (e.g., keywords, images, document type, such as spreadsheet, internal memorandum, press release, strategy document or the like, and other meaningful category) in the user's search query are with respect to the generated theme.

In a more detailed example, when scoring the obtained content and the located search results considered relevant to each user according to the generated theme of the search query, the scoring algorithm may cause the processor to be operable to apply a past preference benchmark to the search query in a scoring algorithm (described in a later example), which is a machine learning algorithm. The processor may determine a past preference score of the search query using a past preference machine learning algorithm that is trained based on an amount of user interaction with a particular item of content provided in search results having a same theme or nearly the same theme. The past preference score may be a value that indicates a user's preference for the particular item of content.

In a further example, the scoring algorithm may generate the past preference score of the search query by aggregating relevancy results from similar search queries of the other users in the user group. In the example, the aggregated relevancy results may be weighted according to different criteria and output a past preference score. Of course, other examples of generating a past preference score may be implemented.

In addition, a work assignment category benchmark may be applied to the search query in a machine learning algorithm. The processor may determine a work assignment category score of the search query using an output from the machine learning algorithm. The processor may be provided the past preference score and the work assignment category score to the search result scoring application for use in evaluating the relevancy of the obtained content. Based on a result of the evaluation, the processor may generate a relevancy score for the obtained content based a result of the search result scoring application using the past preference score, and the work assignment category score. In a further example, the past preference score may also be a quantification of other users in the user's group (i.e., have been given the same work assignment category) preference for the particular item of content with respect to the generated theme. In addition, the scoring algorithm may score the different source content based on the user profile. For example, the user profile may indicate that the user who input the user's search query has limited experience. As a result of the indication of the limited-experience of the user, the scoring algorithm may account for the limited experience by weighting search results considered relevant to the generated theme from a past user preference of a more-experienced user more heavily than those of the limited-experience user.

In addition, or alternatively, a scoring algorithm may score content obtained from different sources of content differently. For example, internal source content may have naming and filing protocols that are more concise and are better indicator of the subject matter of the content than public source content or partner source content. As a result, a search result from the internal source content may be given a higher score by the scoring algorithm with respect to the generated theme than either the public source content or the partner source content.

In block 116, process 100 outputs a set of scored search results to the input/output device. For example, the scored search results may be presented in a web browser, a dashboard associated with the search result scoring application, or the like. Examples of a system that may implement the process 100 are described with reference to the following discussion of FIGS. 2-4.

Figure 2:
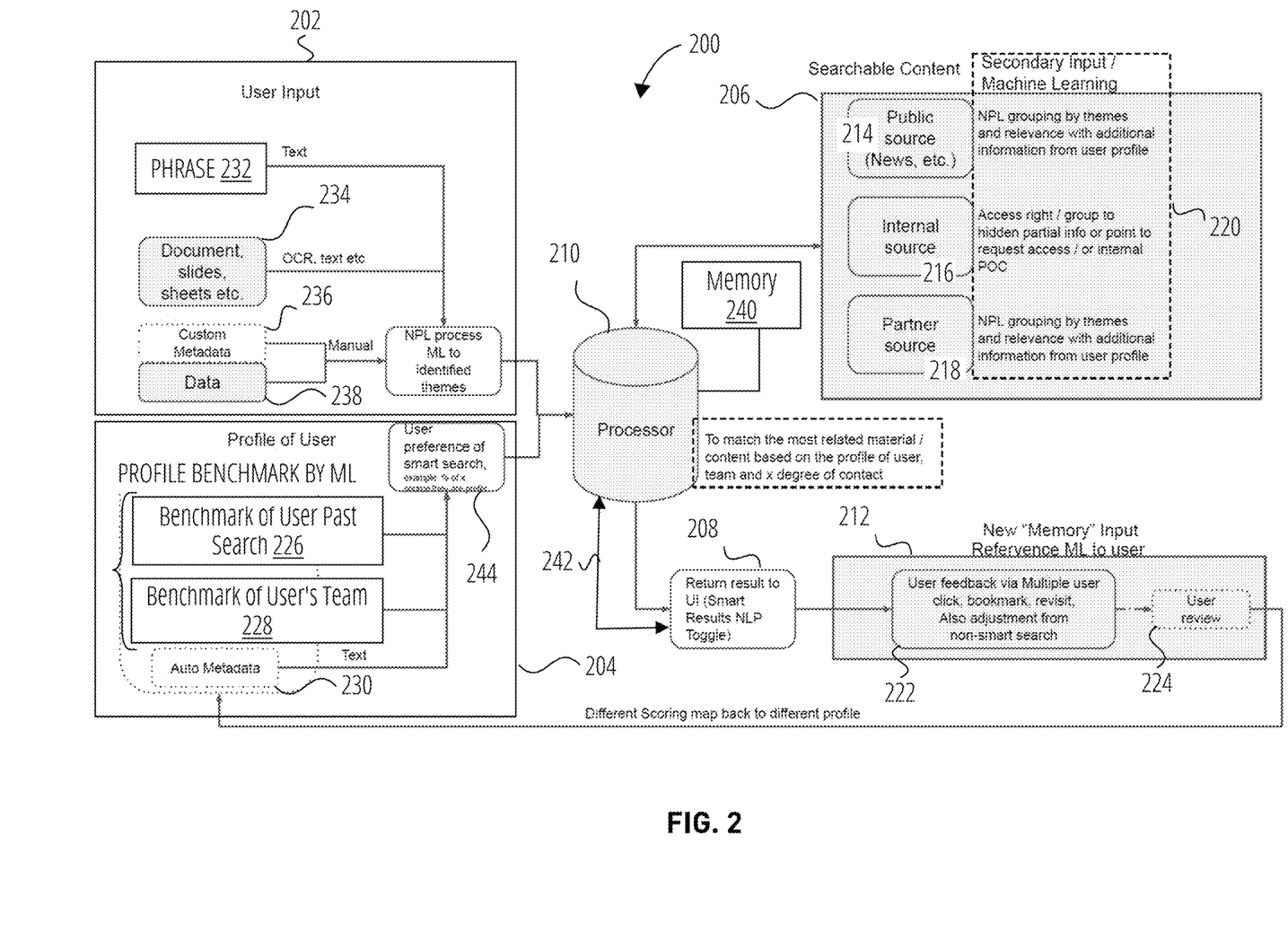
FIG. 2 illustrates a functional block diagram of a database search system to implement the process example of FIG. 1 of the disclosed subject matter.

FIG. 2 illustrates a functional block diagram of a database search system to implement the process example of FIG. 1 of the disclosed subject matter.

The system comprises a user input user input 202, a user profile module 204, a searchable content module 206, a toggle 208, a machine learning training data module 212, a processor 210, a memory 240, a publicly available content 214, an internal source content repository 216, a partner source content 218, a secondary input machine learning engine 220, a user feedback module 222, a user review results component 224, a phrase 232, a benchmark of user past search 226, and a benchmark of user's team 228.

In one aspect, a system 200 includes a memory 240 storing programming code. The memory 240 may be a number of different distributed memories or a single memory. The memory 240 may include a search result scoring application, a number of user profiles, and collected search history. The collected search history may be, for example, a database that includes search terms used in a query, results from the query, and a degree of engagement with results of interest of a number of users (e.g., how often the user reviewed, how long the user reviewed, whether the user indicated the search result for further review, such as by "favoriting" the particular result, or the like). For example, engagement of search results may be evaluated using past search queries located search results considered relevant to each user based on engagement related to the generated theme of the search query. In the example, users assigned to the same group as the user are determined to have user profiles similar to the user profile. The system 200 also include an input/output device (shown in another example).

The user input 202 may be received via a keyboard, microphone, touchscreen, a file input, a scanner, a browser, or other device or system. The user input 202 may be an input of textual phrase 232 (e.g., search query in as a phrase, terms or the like), input of an electronic document 234 (such as an image, a spreadsheet, a text document or the like), custom data 236, such as data that is proprietary to an entity or enterprise, commissioned data (e.g., marketing studies), an input of a prior search query (or the user or another user), or the like, as well as an input of data (numerical) 238 (e.g., demographic statistics, government census statistics, or the like).

The user profile module 204 includes a number of components, such as a benchmark of user past search 226, benchmark of user's team 228, and auto metadata module 230. The benchmark of user past search 226 is a component that evaluates the user's search query with respect to the user's past searches. For example, the benchmark of user past search 226 may be used to evaluate previous search queries to determine similarities to a present search query received from the user by user input user input 202. The user profile module 204 may also evaluate the search query received via user input user input 202 against other users associated with the user by using the benchmark of user's team 228. The benchmark of user's team 228 may be a component that determines a user's work assignment category and evaluates the search query with respect to other users having the same work assignment category as the user who inputted the search query. The evaluation may, for example, include determining a similarity between the inputted search query and one or more previous user's search queries input by other users who have or had the same work assignment category. More specifically, the search queries may be compared to see if similar words or the like were used in the search queries and an algorithm may assign a similarity score, where, for example, a higher similarity score indicates that the search queries are very similar. The evaluation may provide a result, for example, in which the previous user's search queries may be given a similarity score that indicates that the previous user's search uses nearly the same terms as or is substantially on the same topic, as the user's search query. Based on a result of the evaluation (e.g., a similarity score), the processor 210 may be operable to obtain search results that were included in the other user's previous searches.

In an example, the processor 210 may be operable to execute the process 100 illustrated in FIG. 1. For example, the processor 210 may be operable obtain content from the searchable content using the search result scoring application. For example, using different scoring algorithms the processor may be operable to match the content from the search results that is mostly based on the profile of the user, the user's team and/or the set degree of engagement with the related content. The set degree of engagement may be a settable, variable value related to how frequently particular content (e.g., a government regulation, partnership agreement, internal data) has been accessed by a particular user and/or the user's team members. The processor 210 may be coupled to the user input user input 202, user profile module 204, searchable content module 206, the memory 240 and the machine learning training data module 212. Although not shown in this example, the processor 210 may also be coupled to a data network that enables access to content or other users, which may include enterprise partners (who may be the providers of the partner source content), or the like.

The toggle 208 may be more specifically a natural language processor (NLP) that toggles the processor 210 to perform a smart result process as described in the example of FIG. 1. In an example, the process 100 may be a backend process powered by ML models to surface up the smartest result related to the special user base on their profile from past search and feedback loop, see slide for high level overview.

In the machine learning training data module 212, a machine learning model may be used in profile level, with additional input based on contact among a team of users (e.g., users that share the same work assignment category) and the degree of the contact. Contact may be determined for example, based on an evaluation of a user's social or teaming media interactions with other users. For example, the processor executing the search result scoring application may evaluate a user's "inner circle" (e.g., most frequently contacted users or other degree of engagement) that may be based on social dynamic machine learning from another source or just within interaction in the search result scoring application or a combination of both.

A searchable content module 206 that may include repositories (e.g., databases) or connections to various sources of content, such as a publicly available content 214, an internal source content repository 216, or a partner source content 218. Content may include reports (e.g., government regulatory reports, Security Exchange Commission reports, industry-centric organizations), documents, data (e.g., labor statistics, loan default statistics, healthcare statistics) or the like. The content may be considered items of content that are individual pieces (e.g., physical or electronic) of content such as an article, regulation, website, news article or the like. In cases of physical content, such as a textbook or rare book, the returned "content" may be a location of the physical content (e.g., the U.S. Copyright Office). The searchable content module 206 may be operable to enable searching of the respective repositories or sources of content. For example, via an external data network, the searchable content module 206 may be operable to provide a connection to publicly available content 214, such as newspapers, government agency websites and data repositories, public interest group websites (e.g., environmental non-government organization, financial groups or the like), news aggregators, and the like.

In addition, the searchable content module 206 may also have access to content that is generated within the enterprise as internal source content repository 216. The internal source content repository 216 may be maintained by the enterprise and may only be accessible to users within the enterprise (e.g., via an intranet with secure access). The internal source content repository 216 may be reports, memoranda, government submissions, communications (e.g., emails, messages or facsimiles) or the like that have been generated by, or for use by, the enterprise. For example, the enterprise may maintain a confidential record related to a business decision or the like, but which may have relevant information to a user search query. In addition, the internal source content repository 216 may be searchable across business entities and/or lines of business within the enterprise. For example, in a financial institution, internal source content items related to credit cards may be searched by a user assigned to a user work assignment category for savings accounts, auditing, regulatory compliance, technology, or the like.

Yet another source of content may be partner source content 218, which is content that may be provided by an entity that has partnered with the enterprise. For example, an automobile manufacturer may partner with the enterprise for consumer automobile financing or the like. The content provided by the partner source content 218 may be documents, data or the like.

The searchable content module 206 may be searched using a secondary input machine learning engine 220, which is a machine learning algorithm accessible by the search result scoring application executing on a processor 210. The secondary input machine learning engine 220 may utilize a natural language processing algorithm as well as a machine learning algorithm to group content from the respective publicly available content 214, internal source content repository 216, or partner source content 218, by themes (of the content) and relevance with additional information from a user profile, such as work assignment category and number of years of experience, education level or the like. Examples of a machine learning algorithm may include a linear regression algorithm, a logistic regression algorithm, a decision tree, a naive Bayes algorithm, a kNN algorithm or the like, Access to the internal source content repository 216 may be limited, including being hidden, from specific users or from a group of users (based, for example, on work assignment category or seniority). To access some portions of the internal source content repository 216, a user may have to request and receive authorization from a point of contact that maintains access to the internal source content repository 216.

The machine learning training data module 212 may include a user feedback module 222 and a user review results component 224. The machine learning training data module 212 may generate data that is used to update a scoring algorithm used by the search result scoring application. For example, the generated data may include parameters related to user feedback obtained by the user feedback module 222. The user feedback module 222 may be collect data related to user interactions with the respective content from any and all of the searchable content sources. The user interactions may include when multiple users "click" on a particular search result, when a user bookmarks a search result, a number of revisits (which may be an indication of interest). The user feedback module 222 may also keep track of user adjustments (e.g., a user frequently selects a particular filter, the user specifies a specific content source for a specific search query, or the like) when the user is not using the smart results (e.g., the toggle 208 may cause a toggle signal 242 to be provided to the processor 210 either enabling or disabling process 100). The user feedback module 222 may also take the score of respective items of content and use those scores to update scores (either increasing or decreasing the scores) of similar items or dissimilar items of content.

The processor 210 may be further operable to implement the scoring algorithms via execution of the search result scoring application. For example, content of the search results may be pulled from the multiple sources of content utilizing different scoring algorithms. For example, a first scoring algorithm may be applied to the publicly available content 214, a second scoring algorithm may be applied to the internal source content repository 216, and a third scoring algorithm may be applied to the partner source content 218.

In an example, the search result scoring application may perform a best result allocation based on past preference benchmark as part of benchmark of user past search 226 that is continuously refine by user (as well as their user group and closest contact) interaction. For example, the search result scoring application may cause the processor to evaluate the search query based a number of factors, such as based on past action, on which user is most likely related to a subgroup of X type of internal documents (e.g., does the user interact with regulatory documents more often than product development documents) or to a subgroup of Y type of external information from publisher ABC. Therefore, the search result scoring application may cause the search result scoring application to surface those two subgroups at a top of a list for presentation on a graphical user interface (GUI). In other instances, the search result scoring application may utilize "usability" scoring for each individual data source. A usability score may, for example, be based on past results and interaction by respective users with the search results.

In addition, a user profile module 204 may enable a profile layer in the search result scoring application that has the ability to enable (with user consent) the injection of past keywords into the search query when the search query is executed to further refine the search results from the search query. The past keywords are based on user search queries from the past and related to their role within a user team into a present search query by the user.

The building of the respective machine learning algorithms, such as the theme-generating machine learning algorithm, NLP algorithm and the like, as well as the machine learning training data module 212 and the secondary input machine learning engine 220 and those used to generate the user profiles in the benchmark of user's team 228 relies on continued feedback from the system 200. Output from machine learning training data module 212 to the auto metadata module 230 provides training data to the machine learning algorithm, which may be referred to as a user profile machine learning algorithm, that updates both the benchmark of user past search 226 and the benchmark of user's team 228 and user preference 244. User preference 244 may be, for each user who may submit a user search query, set according to the weighting of the respective search queries and search result engagement in the user profile.

The updating of the 230 enables the scoring algorithm to account for the limited experience of a user by weighting search results considered relevant to the generated theme from a past user preference of a more-experienced user more heavily than those of the limited-experience user.

Figure 3:
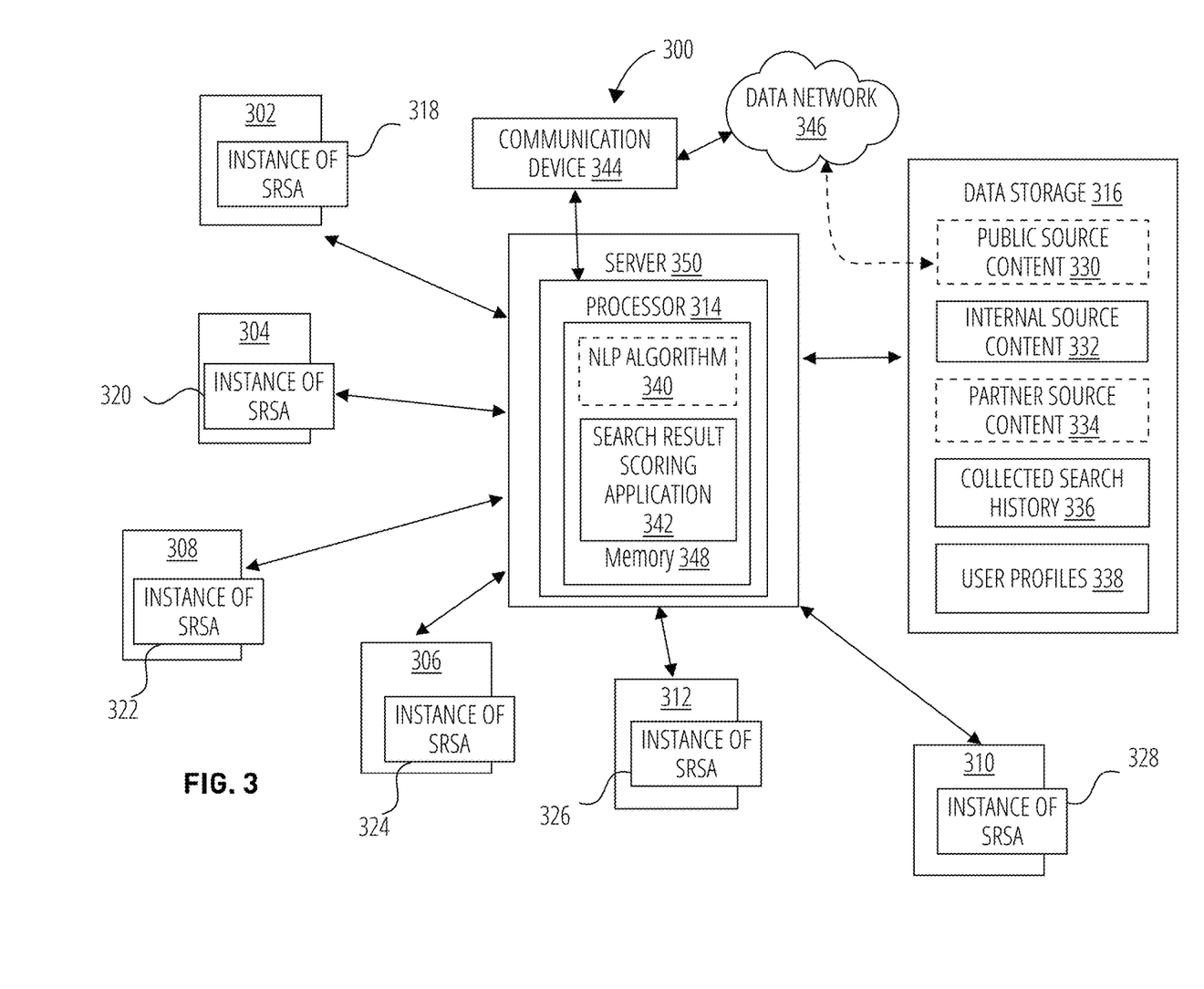
FIG. 3 illustrates a simplified functional block diagram of an enterprise system implementation aspect of the disclosed subject matter.

FIG. 3 illustrates a simplified functional block diagram of an enterprise system implementation aspect of the disclosed subject matter.

The system 300 may include a number of user devices, such as user device 302, user device 304, user device 306, user device 308, user device 310, and user device 312 as well as a server 350 and a data storage 316. Each user device may include an instance of a search result scoring application (SRSA).

For example, user device 302 may include an instance of SRSA 318, user device 304 an instance of SRSA 320, user device 308 an instance of SRSA 322, user device 306 an instance of SRSA 324, user device 312 an instance of SRSA 326, and user device 310 an instance of SRSA 328. The data storage 316 may store public source content 330, internal source content 332, and partner source content 334 as well as collected search history 336 and user profiles 338.

The server 350 may include a processor 314 that may be operable, for example, execute a natural language processing (NLP) algorithm 340 and a search result scoring application 342. The NLP algorithm 340 and the search result scoring application 342 may be stored in a memory 348 of the server 350 or in data storage 316.

The processor 314 may also have access to communication device 344, which may be one or more devices operable to connect to a data network, such as data network 346. The data network 346 may be the internet, a cellular network, a combination of cellular and internet, or the like.

Each of the user devices 302-312 may be a computer device having a processor, a memory, a display device, input device and network connections (as shown in a later example) that enable each respective user device 302-312 to execute its respective instance of SRSA 318-328. The server 350 may be coupled to a data network 346 via the communication device 344 that enables access to content or other users, which may include user partners that may provide partner source content 334 as well as public source content 330, or the like.

Figure 4:
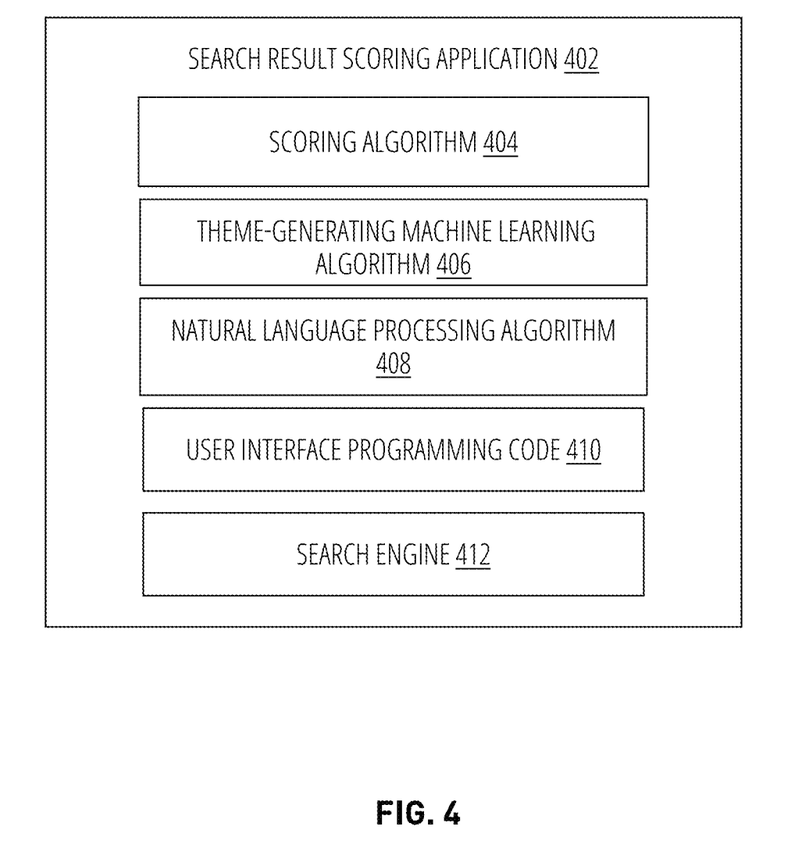
FIG. 4 illustrates a functional block diagram of a search result scoring application as described with respect to the examples of the disclosed subject matter.

FIG. 4 illustrates a functional block diagram of a search result scoring application as described with respect to the examples of the disclosed subject matter.

The search result scoring application 402, a scoring algorithm 404, a theme-generating machine learning algorithm 406, a natural language processing algorithm 408, a user interface programming code 410, and a search engine 412. The elements of search result scoring application 402 may be implemented on a non-transitory computer-readable storage medium.

The natural language processing algorithm 408 may be operable to process the user's search query received via the user input, such as user input 202, as well as the other user's search queries.

In an operational example, the scoring algorithm 404, when executed, may cause a processor to receive, via the input/output device, a search query including one or more of a textual phrase, a document, or data including metadata from a user. For example, the user interface programming code 410 may enable receipt of the search query from a user device (shown in other examples). The processor may initiate the natural language processing algorithm 408 to interpret and process the search query. The processed search query output from the natural language processing algorithm 408 may be in a form needed by the theme-generating machine learning algorithm 406. The search result scoring application 402 may direct the processed search query output of the natural language processing algorithm 408 to the theme-generating machine learning algorithm 406. In response to the user input of the user's search query and the output from the natural language processing algorithm 408, the theme-generating machine learning algorithm 406 may generate a theme of the search query. As mentioned above, a theme may be a regulatory request, a financial audit request, a credit review, an appraisal or other type of analysis of real estate or personal property (e.g., automobile or boat), or the like. The theme-generating machine learning algorithm 406 may be operable to evaluate the values of the output from the natural language processing algorithm 408 against a list of themes (such as those above and more) or utilize a machine learning algorithm to generate a "theme value" that is compared to a list of theme values for each specific theme. The list of theme values may be updated as the machine learning algorithm evolves from training and experience.

The scoring algorithm 404 may also be operable to generate an inter-source relevancy score between content items from the respective content sources (i.e., public source content, internal source content and partner source content). For example, a content item from a news source in the public source content may have a relevancy indicator to an internal source content item that, for example, refers to the news source content item or is somehow related to it (e.g., related by theme, based on an indication by another user, due to the content item being from within a same group within the enterprise or entity, or the like). The inter-source relevancy score may indicate the degree of relevancy (e.g., from high (100) to low (1) on a scale of 100-1) and may be presented to the user in a graphical user interface with the content items resulting from the execution of the user's search query. The inter-source relevancy score may be based on a similarity evaluation of the search results (from all content sources) by a natural language processing algorithm, such as natural language processing algorithm 408 or the like. In an example, the search results from the user's search query may be presented in a first pane of a graphical user interface (GUI) and content items considered relevant to that source may be presented to the user in a second pane of the GUI. In a further example, the scoring algorithm 404 may be operable to score the obtained content and the search result may be presented for consideration by the user in a rank-ordered format based on likelihood of match to the query theme. The user, when reviewing the presented search results, has the ability to further score the rank-ordered obtained content with their own relevancy score (example: 1 (low) to 5 (high) relevancy). The user score can be used to retrain the scoring algorithm periodically and uniquely 404 (as described with reference to 212 of FIG. 2 above) by modifying tuning parameters or coefficients for various search combinations (e.g., based on the combinations of one or more of a unique user work assignment category, the users' roles within specific user groups, user's area of subject matter expertise, repository or content source searched, and the like).

The search result scoring application 402 may be further operable to cause the processor to locate other users having profiles similar to a profile of the user that inputted the search query. For example, a user profile may be based on a user group to which the other user and other users are assigned as well as other information. The processor may be operable to identify additional users, not yet included in a user group but that have a work assignment category related to the work assignment category in the profile of the user. For example, users with the related work assignment category may have performed data system searches using a similar search query that has search terms similar to the received search query. The processor may be operable to group the identified additional users in the user group with the identified other users.

Via the user interface programming code 410, the search result scoring application 402 may cause the processor to obtain a number of search histories by retrieving a search history of each of the located other users from a collected search history, such as collected search history 336 of FIG. 3. Once the search history of each of the located other users is obtained, the search result scoring application 402 may be operable to identify content corresponding to the generated theme in at least one of the number of search histories. For example, data related to the search results of the at least one of the number of search histories may be evaluated with reference to the generated theme of the search query. In the example, the content that has some correspondence to the generated theme (e.g., 70% of the search query terms are included in a theme definition) may be flagged or otherwise identified for further processing. The content may be obtained from data storage, if available. For example, content that was used in a particular matter, such as a response to a regulator matter or the like, may be stored in an internal source content database with respect to the particular matter (e.g., a relational database that maintains internal source content).

The further processing may be conducted by the search engine 412. Continuing with the operational example, the search engine 412 may also obtain the processed search query output of the natural language processing algorithm 408. In addition, when the identified content is not attainable as internal source content, the search engine 412 may obtain data, such as a uniform resource locator (URL) or the like, of the content that enables the search engine 412 to locate and obtain the data.

The search result scoring application 402 may execute the search query via the search engine 412 to obtain content corresponding to the generated theme of the search query from a searchable content module, such as searchable content module 206. As mentioned in an earlier example, the searchable content module may include public source content and internal source content as well as, possibly, partner source content. For example, the search engine 412 may be operable to access the searchable content, for example, via the searchable content module 206 of FIG. 2. The search result scoring application 402 may provide the search results of the search query obtained by the search engine 412 to the scoring algorithm 404. The scoring algorithm 404 may score the obtained content and the identified content, if available. The scoring algorithm 404 may use previous user's indication of the relevancy of content in the scoring of the content. For example, an item of content (e.g., individual pieces of content such as an article, regulation, website, news article or the like) identified from a previous search history in which the content was given a high relevancy for a similar theme may be given a higher score than another item of content. Once the scoring algorithm 404 completes the scoring, the search result scoring application 402 may output a set of scored search results that the processor directs to the input/output device or a connected computer device (as shown in an earlier example) for presentation to the user or another process.

As mentioned, the search result scoring application may utilize "usability" scoring for each individual data source (i.e., public source content, internal source content, and partner source content). A usability score may, for example, be based on past results and interaction by respective users with the previous search results, and the usability score may be further utilized or modified. For example, the search result scoring application 402 may be operable to rescore each score from the different content sources based on multipliers from each content source (i.e., public source content, internal source content and partner source content as well as individual sources within each of those—such as government website and news aggregator in a public source content) to have more content source diversity in the top scores of the search results. This may evolve into quantification of the relationships between the individual sources within each content source of the searchable content module 206 (e.g., relevancy of an internal source content to an external source content).

As shown in earlier examples, instances of the search result scoring application 402 may be implemented at the user devices, an enterprise network or in a distributed network or as a cloud-based service.

Figure 5:
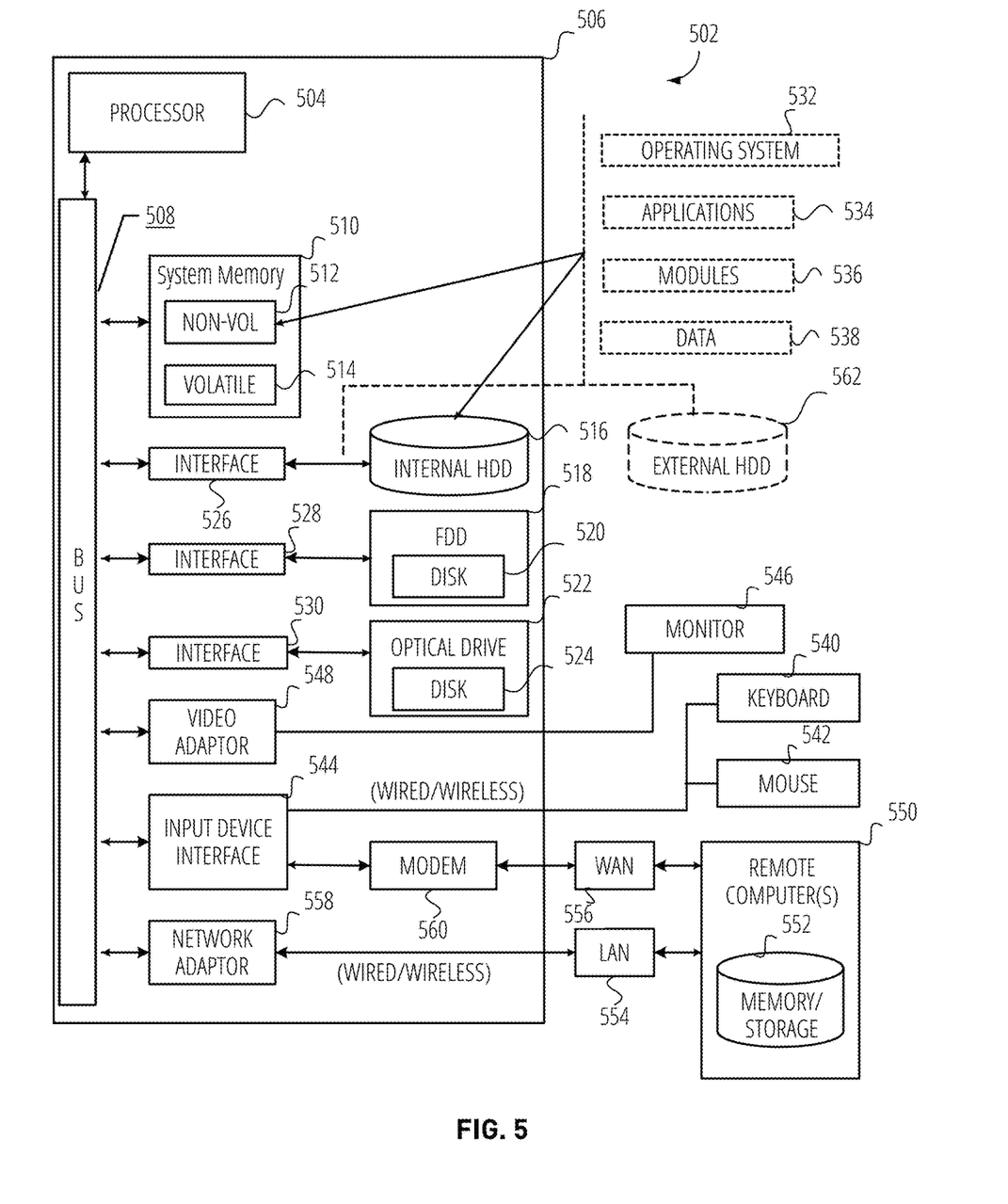
FIG. 5 illustrates a functional block diagram of an example computing architecture suitable for implementing the disclosed subject matter.

FIG. 5 illustrates a functional block diagram of an example computing architecture suitable for implementing the disclosed subject matter. The example of the computing architecture 502 may be suitable for implementing various examples as previously described. In various examples, the computing architecture 502 may include or be implemented as part of an electronic device. In some examples, the computing architecture 502 may be representative, for example, of a system that implements one or more components of the system 200. In some examples, the computing architecture 502 may be representative, for example, of the user devices 302-312 and server 350 of the system 300. All or some components of the computing architecture 502 may be implemented as a computing system 506 that may be a smartphone, a laptop, a desktop device, a dedicated internet device (e.g., a Chromebook™), or the like). The examples are not limited in this context. More generally, the computing architecture 502 is operable to implement all logic, applications, systems, methods, apparatuses, and functionality described herein with reference to FIGS. 1-4.

The computing architecture 502 may include a processor 504, a system memory 510, and a system bus 508. The processor 504 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multiprocessor architectures may also be employed as the processor 504. In addition, or alternatively, the computing architecture 502 may include various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The examples, however, are not limited to implementation by the computing architecture 502.

The system bus 508 provides an interface for system components including, but not limited to, the system memory 510 to the processor 504. The system bus 508 can be any of several types of bus structure that may further interconnect to a memory bus (with or without a memory controller), a peripheral bus, and a local bus using any of a variety of commercially available bus architectures. Interface adapters may connect to the system bus 508 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 510 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated example shown in FIG. 5, the system memory 501 can include non-volatile memory 512 and/or volatile memory 514. A basic input/output system (BIOS) can be stored in the non-volatile memory 512.

The computing architecture 502 may include various types of computer-readable storage media in the form of one or more lower speed memory units, including an internal hard disk drive (HDD) 516 (or external HDD 562), a magnetic floppy disk drive (FDD) 518 to read from or write to a removable magnetic disk 520, and an optical disk drive 522 to read from or write to a removable optical disk 524 (e.g., a CD-ROM or DVD). The internal HDD 516 or external HDD 562, FDD 518 and optical disk drive 522 can be connected to the system bus 508 by an HDD interface 526, an FDD interface 528 and an optical drive interface 530, respectively. The HDD interface 526 for external drive implementations can include at least one or both of Universal Serial Bus (USB) and IEEE 1394 interface technologies. The computing architecture 502 may be specifically operable to implement all logic, systems, methods, apparatuses, and functionality described herein with reference to FIGS. 1-4.

The drives and associated computer-readable media provide volatile and/or nonvolatile storage of data, data structures, computer-executable instructions, and so forth. For example, a number of program modules can be stored in the drives and memory units 510, 512, including an operating system 532, one or more application programs 534, other program modules 536, and program data 538. In one example, the one or more application programs 534, other program modules 536, and program data 538 can include, for example, the various applications and/or components of the system 200, e.g., the operating system 532, and other applications 534 and algorithms, such as the search result scoring application, the natural language processing algorithm, the theme-generating machine learning algorithm, the user interface programming code, the search engine, and the scoring algorithm.

A user can enter commands and information, such as the user's search query into the components of the computing architecture 502 through one or more wire/wireless input devices, for example, a keyboard 540 and a pointing device, such as a mouse 542. Other input devices may include microphones, infra-red (IR) remote controls, radio-frequency (RF) remote controls, game pads, stylus pens, card readers, dongles, fingerprint readers, gloves, graphics tablets, joysticks, keyboards, retina readers, touch screens (e.g., capacitive, resistive, etc.), trackballs, trackpads, sensors, styluses, and the like. These and other input devices are often connected to the processor 504 through an input device interface 544 that is coupled to the system bus 508 but can be connected by other interfaces such as a parallel port, IEEE 1394 serial port, a game port, a USB port, an IR interface, and the like.

A monitor 546 or other type of display device is also connected to the system bus 508 via an interface, such as a video adaptor 548. The monitor 546 may be internal or external to the computing architecture 502. In addition to the monitor 546, a computer typically includes other peripheral output devices, such as speakers, printers, and the like (not shown).

The computing architecture 502 may operate in a networked environment using logical connections via wire and/or wireless communications to one or more remote computers, such as a remote computer 550. The remote computer 550 can be a workstation, a server computer, a router, a personal computer, portable computer, microprocessor-based entertainment appliance, a peer device or other common network node, and typically includes many or all of the elements described relative to the computing architecture 502, although, for purposes of brevity, only a memory/storage device 552 of the remote computer 550 is illustrated. The logical connections depicted include wire/wireless connectivity to a local area network (LAN) 554 and/or larger networks, for example, a wide area network (WAN) 556. Such LAN and WAN networking environments are commonplace in offices and companies, and facilitate enterprise-wide computer networks, such as intranets, all of which may connect to a global communications network, for example, the Internet. In examples, the data network 346 of FIG. 3 may be one or more of the LAN 554 and the WAN 556.

When used in a LAN networking environment, the computing architecture 502 is connected to the LAN 554 through a wire and/or wireless communication network interface or adaptor 558. The network adaptor 558 can facilitate wire and/or wireless communications to the LAN 554, which may also include a wireless access point disposed thereon for communicating with the wireless functionality of the network adaptor 558.

When used in a WAN networking environment, the computing architecture 502 can include a modem 560, or is connected to a communications server on the WAN 556 or has other means for establishing communications over the WAN 556, such as by way of the Internet. The modem 560, which can be internal or external and a wire and/or wireless device, connects to the system bus 508 via the input device interface 544. In a networked environment, program modules depicted relative to the computing architecture 502, or portions thereof, can be stored in the remote memory/storage device 552 of the remote computer 550. It will be appreciated that the network connections shown are exemplary and other means of establishing a communications link between the computers can be used.

The computing architecture 502 may be operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

As used in this application, the terms "system" and "component" and "module" are intended to refer to a computer-related entity, either hardware, a combination of hardware and software, software, or software in execution, examples of which are provided by the exemplary computing architecture 500. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further examples, however, may alternatively employ data messages. Such data messages may be sent across various connections. Exemplary connections include parallel interfaces, serial interfaces, and bus interfaces.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution or may be written in a scripting language such as (but not limited to) HTML or XML. The computer executable instructions may be stored on a computer readable medium such as a non-volatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to convey the substance of their work most effectively to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A system, comprising:
a memory storing programming code including a search result scoring application, a plurality of user profiles, and collected search history, wherein the collected search history is a database that includes search terms used in a query, results from the query, and a degree of engagement with results of interest of a plurality of users;
an input/output device; and
a processor operable to:
receive, via the input/output device, a search query including one or more of a textual phrase, a document, or data including metadata from a user;
generate a theme of the search query based on an evaluation of the search query;
locate other users having profiles similar to a user profile of the user from whom the search query was received, wherein the user profile is based on a user group to which the user and the other users are assigned;
obtain a plurality of search histories by retrieving a search history of each of the located other users from the collected search history;
identify content corresponding to the generated theme in at least one of the plurality of search histories;
execute the search query to obtain content corresponding to the generated theme of the search query from a searchable content module, wherein the searchable content module includes public source content and internal source content, the execution of the search query to identify the public source content from a public source having a similar theme as the search query and identify the internal source content from an internal source searchable content repository based on a work assignment category obtained from the user profile;
score the obtained content and the identified content using a scoring algorithm based on a result of an evaluation of search history results considered relevant to each user for relevancy to the generated theme of the search query, wherein the score is based on application of the search result scoring application to the identified public source content and the identified internal source content; and
output a set of scored search results to the input/output device.

2. The system of claim 1, wherein the processor, when generating the generated theme of the search query, is further operable to:
evaluate the search query using a natural language processing algorithm;
evaluate the metadata related to the textual phrase, the document or the data;
input results of the evaluation of the metadata ad the results of the natural language processing algorithm into a theme-generating machine learning algorithm; and
receive an indication of a theme of the search query based on the results of the theme-generating machine learning algorithm.

3. The system of claim 1, wherein the processor, when locating the other users, is further operable to:
identify the other users in the plurality of user profiles having a work assignment category that is a same work assignment category as in the user profile; and
group the identified other users in the user group with the user.

4. The system of claim 3, wherein the processor, when locating the other users, is further operable to:
identify additional users, not yet included in the user group, that have a work assignment category related to the work assignment category in the user profile, wherein users with the related work assignment category perform data system searches using a similar search query that has search terms similar to the received search query; and
group the identified additional users in the user group with the identified other users.

5. The system of claim 1, wherein the processor, when obtaining a plurality of search histories by retrieving a search history of each of the located other users, is further operable to:

identify past search queries of each user having a profile similar to the user that have a theme that is substantially similar to the generated theme; and retrieve content from the identified past search queries that was indicated as relevant by a respective user of the identified past search queries.

6. The system of claim 1, wherein the processor, when obtaining the content corresponding to the generated theme, is further operable to:

identify partner source content from a partner source search content repository of searchable content; and input the identified partner source content with the identified public source content and identified internal source content into the search result scoring application, wherein the search result scoring application is further applied to the identified partner source content.

7. The system of claim 1, wherein the processor, when scoring the obtained content and the identified content, is further operable to:

apply a past preference benchmark to the search query in a machine learning algorithm;

determine a past preference score of the search query from the machine learning algorithm based on the applied past preference benchmark;

apply a work assignment category benchmark to the search query in the scoring algorithm;

determine a work assignment category score of the search query from the scoring algorithm;

provide the past preference score and the work assignment category score to the search result scoring application; and generate a relevancy score for the obtained content based a result of the search result scoring application using the past preference score, and the work assignment category score.

8. A method, comprising:

receiving, via an input/output device, a search query including one or more of a textual phrase, a document, or data including metadata;

generating, by a processor executing a theme-generating machine learning algorithm, a theme of the search query;

locating profiles of other users from a plurality of user profiles that are identified as similar to a user profile of a user from whom the search query was received based on a group to which the other users are assigned;

locating a search history of each of the other users having a profile identified as similar to the user profile in a collected search history;

evaluating, by the processor, the located search history of each of the other users having the profile identified as similar to the user profile and the user in the located search history based on the generated theme of the search query;

obtaining content in a searchable content that corresponds to the generated theme of the search query and according to a result of evaluation of the located search history of each of the other users, wherein the searchable content includes public source content and internal source content, the obtaining content to identify the public source content from a public source having a similar theme as the search query and to identify the internal source content from an internal source searchable content repository of the searchable content based on a work assignment category obtained from the user profile;

scoring the obtained content based on a scoring algorithm, the score based on application of a search result scoring application to the identified public source content and the identified internal source content; and outputting a set of scored search results to the input/output device.

9. The method of claim 8, wherein when generating the theme of the search query, the method further comprises:

evaluating the search query using a natural language processing algorithm;

inputting results of the natural language processing algorithm into the theme-generating machine learning algorithm;

evaluating the metadata related to the textual phrase, the document or the data;

inputting results of the evaluation of the metadata into the theme-generating machine learning algorithm; and based on an output of the theme-generating machine learning algorithm, results of evaluation by the natural language processing algorithm, and the results of the evaluation of the metadata, receiving an indication of a theme of the search query.

10. The method of claim 8, wherein when locating the profiles of other users from the plurality of user profiles that are identified as similar to the user profile, the method further comprises:

identifying the other users in the plurality of user profiles having a work assignment category that is a same work assignment category as in the user profile; and grouping the identified other users in a user group.

11. The method of claim 8, wherein when evaluating the located search history of each of the other users having the profile identified as similar to the user profile and the user in the located search history based on the generated theme of the search query, the method further comprises:

identifying past search queries of each user with the identified similar profile that have a theme that is a same as the generated theme; and retrieving content from the identified past search queries that was indicated as relevant by respective user of the identified past search queries.

12. The method of claim 8, wherein when evaluating the located search history of each of the other users having the profile identified as similar to the user profile and the user in the located search history based on the generated theme of the search query, the method further comprises:

identifying partner source content from a partner source search content repository of the searchable content; and inputting the identified partner source content with the identified public source content and identified internal source content into the search result scoring application.

13. The method of claim 8, wherein when scoring the obtained content, the method further comprises:

applying a past preference benchmark to the search query in a machine learning algorithm;

determining a past preference score of the search query from the machine learning algorithm;

applying a work assignment category benchmark to the search query in the scoring algorithm;

determining a work assignment category score of the search query from the scoring algorithm;

providing the past preference score and the work assignment category score to the search result scoring application; and generating a relevancy score for the obtained content based a result of the search result scoring application using the past preference score, and the work assignment category score.

14. A non-transitory computer-readable storage medium, the computer-readable storage medium including instructions that when executed by a processor, cause the processor to:
receive, via an input/output device, a search query including one or more of a textual phrase, a document, or data including metadata;
generate, by the processor executing a theme-generating machine learning algorithm, a theme of the search query;
locate profiles of other users from a plurality of user profiles that are identified as similar to a user profile of a user from whom the search query was received based on a group that the other users are assigned;
locate a search history of each of the other users having a profile identified as similar to the user profile in a collected search history;
evaluate, by the processor, the located search history of each of the other users having the profile identified as similar to the user profile and the user in the located search history based on the generated theme of the search query;
obtain content corresponding to the generated theme of the search query from a searchable content module, wherein the searchable content includes public source content and internal source content, wherein obtaining the content comprises identification of the public source content from a public source having a similar theme as the search query and identification of the internal source content from an internal source searchable content repository of the searchable content based on a work assignment category obtained from the user profile;
score the obtained content based on a result of an evaluation of the located search history of each of the other users having the profile identified as similar to the user profile, the score based on application of a scoring algorithm to the identified public source content and the identified internal source content; and
output a set of scored search results to the input/output device.

15. The computer-readable storage medium of claim 14, wherein when generating the theme of the search query, the computer-readable storage medium includes further instructions that when executed by a processor, cause the processor to:
evaluate the search query using a natural language processing algorithm;
input results of the natural language processing algorithm into the theme-generating machine learning algorithm;
evaluate the metadata related to the textual phrase, the document or the data;
input results of the evaluation of the metadata into the theme-generating machine learning algorithm; and
based on an output of the theme-generating machine learning algorithm using results of the natural language processing algorithm and the results of the evaluation of the metadata, receive an indication of a theme of the search query.

16. The computer-readable storage medium of claim 14, wherein when locating the profiles of other users from the plurality of user profiles that are identified as similar to the user profile, the computer-readable storage medium includes further instructions that when executed by a processor, cause the processor to:
identify the other users in the plurality of user profiles having a work assignment category that is a same work assignment category as in the user profile; and
group the identified other users in a user group.

17. The computer-readable storage medium of claim 14, wherein when scoring the obtained content considered relevant to each user for relevancy to the generated theme of the search query, the computer-readable storage medium includes further instructions that when executed by a processor, cause the processor to:
apply a past preference benchmark to the search query in a machine learning algorithm;
determine a past preference score of the search query from the machine learning algorithm;
apply a work assignment category benchmark to the search query in the machine learning algorithm;
determine a work assignment category score of the search query from the machine learning algorithm;
provide the past preference score and the work assignment category score to a search result scoring application; and
generate a relevancy score for the obtained content based a result of a search result scoring application using the past preference score, and the work assignment category score.

* * * * *